United States Patent [19]

Vedove

[11] Patent Number: 4,885,210

[45] Date of Patent: Dec. 5, 1989

[54] COMPOSITE SHEET FOR IMPERVIOUS COATING OF CONSTRUCTION COMPONENTS

[75] Inventor: Walter D. Vedove, Brussels, Belgium

[73] Assignee: Solvay & Cie. (Société Anonyme), Brussels, Belgium

[21] Appl. No.: 41,295

[22] Filed: Apr. 22, 1987

[30] Foreign Application Priority Data

Apr. 24, 1986 [FR] France .................................. 86 06080

[51] Int. Cl.⁴ .......................... B32B 9/04; B32B 27/08
[52] U.S. Cl. ................................... 428/447; 428/451; 428/518; 428/520
[58] Field of Search ................. 428/523, 35, 522, 447, 428/518, 520, 451

[56] References Cited

U.S. PATENT DOCUMENTS 4,337,768  7/1982  Hatada et al. .................... 428/35 X
4,707,389  11/1987  Ward .............................. 428/522 X

FOREIGN PATENT DOCUMENTS 2052525  1/1981  United Kingdom .

Primary Examiner—Thomas J. Herbert
Attorney, Agent, or Firm—Spencer & Frank

[57] ABSTRACT

Composite sheet for the impervious coating of construction components which are covered with a water-repellent hydrocarbon material (for example, bitumen or expanded polystyrene), comprising at least two superposed layers based on flexible polyvinyl chloride, in which the surface of the layer intended to be placed on the hydrocarbon material is subjected to a cold plasma treatment.

3 Claims, No Drawings

COMPOSITE SHEET FOR IMPERVIOUS COATING OF CONSTRUCTION COMPONENTS

BACKGROUND OF THE INVENTION

1. Field of the Invention

The present invention relates to a composite sheet for impervious coating of construction components which are covered with a water-repellent hydrocarbon material. It relates more particularly to a composite sheet for impervious coating of roofing components covered with a material based on bitumen or expanded polystyrene. It also relates to a process for the manufacture of such composite sheets.

2. Description of the Related Art

At the present time impervious coating of construction components which are continuously exposed to the action of atmospheric agents (rain, snow, sunlight, wind etc) is largely provided by means of sheets of waterproof thermoplastic materials which to a greater or lesser extent stand up well to inclement weather and to the longterm effect of ultraviolet rays. In most cases, these are sheets based on flexible polyvinyl chloride, which have both the strength and the flexibility which are necessary for this utilization.

However, until now, it has not been possible to use sheets based on polyvinyl chloride for coating construction components covered with water-repellent hydrocarbon materials such as materials based on bitumen, tar or asphalt, or materials based on expanded polystyrene.

These sheets based on flexible polyvinyl chloride contain, in fact, a relatively large quantity of a plasticizer, which is, in most cases, a fairly volatile organic ester which is gradually extracted from these sheets by the said hydrocarbon materials. As a result, these sheets become hard and brittle and they crack and can no longer provide the construction components which they cover with any imperviousness at all (Kalle Patent Application DE-A No. 1,184,481, column 1, lines 1 to 18).

Attempts have already been made to overcome this disadvantage in many ways. Thus, it has been proposed to replace at least a part of the polyvinyl chloride in these sheets with chlorinated polyethylene (abovementioned patent application). This attempt, which involves the manufacture and the mixing of polymers of two different types, the of which (polyethylene) needs, moreover, to be mod chlorination, is costly and has not been found wholly satisfactory. Attempts have also been made to replace the monomeric plasticizers of polyvinyl chloride, which are in most cases esters derived from monohydric alcohols, polymeric plasticizers derived from dicarboxylic acids and from polyhydric alcohols such as propyl and butylene glycols (H. A. Sarvetnick, Polyvinyl Chloride, Reinhold Plastics Applications Series, Van Nostrand Reinhold Company, 1969, page 70).

While these polymeric plasticizers are less volatile and are less liable to be extracted than the monomeric plasticizers, they are costly products which are less effective and which consequently lead to less flexible and less resistant products (op. cit., pages 70 and 71).

Techniques which avoid direct contact between the sheet based on flexible polyvinyl chloride and these materials have also been tried in order to solve the problem of the extraction of plasticizer by hydrocarbon materials. Thus, for example, felts of various kinds have been combined by hot lamination with the face of the sheet which is intended to be placed in contact with the hydrocarbon material; the face of the sheet intended to be placed in contact with the hydrocarbon material has also been coated with varnishes based on acrylic, polyester or fluoropolymer resins. These techniques have not been found entirely satisfactory either, because the felt inserted, or the coating varnish, itself gives rise to plasticizer extraction (op. cit., page 72) or does not sufficiently resist this extraction.

Attempts have also been made to overcome the disadvantages resulting from the gradual extraction of the plasticizer from sheets based on flexible polyvinyl chloride by hydrocarbon covering materials by employing methods which rely on special treatments of the surface of these sheets (abovementioned patent application DE-A No. 1,184,481, column 1, lines 19–21).

However, these methods, too, have been set aside because the resulting improvement involves only an extremely surface layer of the sheet and consequently disappears idly when this layer is damaged by chemical or mechanical agents (idem, column 1, lines 22 to 27).

SUMMARY OF THE INVENTION

The present invention is aimed at providing sheets based on flexible polyvinyl chloride which are suitable for coating construction components covered with water-repellent hydrocarbon materials, that is to say chiefly with materials based on bitumen, tar and asphalt, and materials based on expanded polystyrene, without exhibiting the abovementioned disadvantages.

The invention relates, therefore, to a composite sheet for the impervious coating of construction components which are covered with a water-repellent hydrocarbon material, comprising at least two superposed layers based on flexible polyvinyl chloride, in which the surface of the layer intended to be placed on the hydrocarbon material is subjected to a cold plasma treatment.

The polyvinyl chloride forming part of the composition position of the layers of the composite sheet according to the invention may be chosen from vinyl chloride homopolymers polymers or from copolymers containing a major proportion (higher 50% by weight) of this monomer. These copolymers are produced by copolymerizing vinyl chloride with one or more lymerizable monomers such as vinyl esters, for example vinyl acetate, vinyl ethers, for example ether vinyl ether, acrylic and methacrylic acids and their esters, for example methyl acrylate, fumaric acid and its esters, for example ethyl fumarate, maleic acid, its anhydride and its esters, for example ethyl maleate, vinyl aromatic-compounds, for example styrene, vinylidene halides, for example vinylidene chloride, acrylonitrile, methacrylonitrile, and olefins, for example ethylene.

The polyvinyl chloride forming part of the composition of the layers of the composite sheet according to the invention may also consist of a mixture of polymers, particularly a mixture of vinyl chloride polymers with a synthetic elastomer such as ethylene/vinyl acetate copolymers, butadiene/acrylonitrile copolymers, styrene/acrylonitrile copolymers, methyl methacrylate/styrene/butadiene copolymers, acrylonitrile/styrene/butadiene copolymers, polyamides, caprolactam polymers, ethylene/propylene/diene terpolymers, urethane elastomers, and polybutadienes modified with epoxy resins; the proportion of synthetic elastomer in the mixture does not, however, exceed 50% by weight, based on the weight of the vinyl chloride polymer.

The layers of the composite sheet according to the invention may be based on different polyvinyl chlorides or, preferably, based on the same polyvinyl chloride.

Each layer of the composite sheet according to the invention also contains a conventional polyvinyl chloride plasticizer in order to give the sheet the required flexibility. This plasticizer is generally chosen from phthalic acid esters such as, for example, dibutyl, dioctyl, diisodecyl and butyl benzyl phthalates, from aliphatic dicarboxylic acid esters such as, for example, dioctyl fumarate, dioctyl adipate and dibutyl sebacate, from polyol esters such as, for example, pentaerythritol esters and diethylene and dipropylene glycol dibenzoates, from fatty acid esters such as, for example, methyl acetylricinoleate, from phosphoric acid esters such as, for example, tricresyl, triphenyl and trinonyl phosphates, from epoxidized oils such as, for example, epoxidized soya bean and linseed oils, from citric acid esters such as, for example, trioctyl and tributyl acetylcitrates, or, again, from polyester-based plasticizers such as, for example, trimethyl trimellitate, tetra-n-octyl pyromellitate and propylene glycol adipate.

For availability and cost reasons, the plasticizer is preferably chosen from phthalic acid esters and from aliphatic dicarboxylic acid esters, especially, on the one hand, dioctyl and diisodecyl phthalates and, on the other hand, dioctyl fumarate and adipate.

Each layer of the composite sheet according to the invention may contain one or more of the plasticizers listed above, in proportions which are generally between 10 and 90 parts per 100 parts by weight of polyvinyl chloride, preferably between 30 and 75 parts per 100 parts by weight of polyvinyl chloride. Preferably, each of the layers of the composite sheet contains approximately the same proportion of the same plasticizer(s).

According to the invention, other conventional additives may also be incorporated, to improve various properties of the composite sheet, such as resistance to atmospheric agents and to inclement weather, stability, to make it easier to process, to reduce its cost, and so on. Among these conventional additives there may be mentioned:

heat stabilizers, such as metal salts of carboxylic acids, for example calcium, barium and zinc stearates, lead compounds, for example the sulphate and the phosphite, organotin compounds, for example dibutyltin dilaurate and dioctyltin maleate;

lubricants and antistatic agents, such as higher fatty acids and their esters and amides, for example butyl stearate and ethylenebisstearamide, and polyethylene waxes;

fillers, such as calcium carbonate, asbestos, silicas, talc, and the like;

flameproofing agents, such as antimony oxide, phosphorus esters, and the like;

light-stabilizers, such as benzophenones, for example 2,4-dihydroxybenzophenone, benzotriazoles, for example 2-(2'-hydroxy-5-methylphenyl)benzotriazole, pigments, for example titanium dioxide and carbon black, which may also improve light-stability; and other known additives, such as colorants, fungicidal agents, antioxidants and the like.

Other details concerning the nature and the function of the various conventional additives which may be present in the composite sheet according to the invention, as well as the proportions in which they may be present, are mentioned in chapters 6 and 7 of the work by H. A. Sarvetnick, "Polyvinyl Chloride", referred to above (pages 88 to 137), which are incorporated by reference in the present description.

The composite sheet according to the invention is manufactured by assembling the layers whose composition has been described above, which are themselves made by any conventional technique such as extrusion moulding, calendering, compression moulding, thermoforming, and the like.

The assembly of the superposed layers forming part of the composite sheet according to the invention may be produced using any technique which is generally known for this purpose, and, in particular, by bonding or laminating the said layers with the application of heat and pressure.

The composite sheet produced in this manner comprises at least two superposed layers; the layer intended to be placed on the abovementioned hydrocarbon material (also referred to hereinafter as the "treated layer") generally has a thickness of the order of a fraction of a millimeter; the layer(s) with which this layer is assembled generally has (have) a thickness of between a fraction of a millimeter and several millimeters.

Preferably, the composite sheet according to the invention consists of two layers, with the treated layer having a thickness of the order of 0005 to 1.5 mm, more particularly of the order of 0.1 to 0.8 mm, and with the second layer having a thickness of the order of 0.1 to 5 mm, more particularly of the order of 0.5 to 1.5 mm.

According to the invention, the surface of the layer of the composite sheet which is intended to be placed on the hydrocarbon material is subjected to a cold plasma treatment. This treatment consists in exposing the said surface to a plasma atmosphere of inorganic gas at low temperature. Such treatment may be carried out, non-continuously or continuously, in a plasma chamber equipped internally with electrodes which produce therein a low temperature plasma under reduced pressure, by means of luminescent discharge produced under a discharge voltage between the electrodes, in the inorganic gas.

The inorganic gas in whose presence the low temperature plasma is generated is generally chosen from helium, neon, argon, nitrogen, oxygen, air, nitrous oxide, nitrogen dioxide, carbon monoxide and dioxide, sulphur dioxide, hydrogen sulphide, hydrogen, chlorine, fluorine and hydrogen chloride. These gases may be employed by themselves or as mixtures. Among the gases listed above, those particularly preferred are argon and carbon monoxide.

The pressure in the plasma chamber is generally between 0.001 and 10 torr, preferably between 0.01 and 5 torr, in order to ensure the stability of the luminescent discharge, which is produced by applying between the electrodes an electrical power which is generally between 10 W and 500 kW, at a frequency which is generally between 50 Hz and 2.5 GHz.

The frequency range of the electrical discharge is not limited to the high frequency region indicated above, but may extend to direct current, to low frequency or to microwaves.

The plasma generator device is not limited to those comprising a chamber which is equipped internally with electrodes, but may be of the type containing external electrodes or a coiled electrode. The electrodes may be connected to a high-frequency generator by capacitive or inductive coupling. The shape of the electrodes is not particularly critical; the power electrode and the earthing electrode may be of the same shape or different shapes, such as plates, rods, rings, cylinders, and the like. It is often desirable that the internal walls of the plasma chamber be made of metal in order to serve as an electrode, in most cases for earthing.

In all cases, the cold plasma treatment is carried out so that the heat released by the electrical discharge does not damage the surface of the layer of the composite sheet which is subjected thereto.

The cold plasma treatment of the layer of the composite sheet which is intended to be placed on the hydrocarbon material may be applied before, during or after assembly of the constituent layers of the said sheet. It has been found that, to avoid assembly problems, it is preferable to apply the cold plasma treatment to the layer in question after the assembly of the constituent layers of the composite sheet. It may also be preferable to avoid any plasma treatment effect on the sheet surface facing away from the treated surface, especially where the sheets are assembled by adhesion. For this purpose, the said surface may be protected during the plasma treatment by any suitable means, such as the interposition of a masking sheet, and the like.

In order to improve the effectiveness of the cold plasma treatment and hence to decrease further the plasticizer extraction phenomenon, the treated layer may contain an additive capable of improving the properties imparted by the cold plasma treatment. This additive is generally chosen from agents which accelerate the surface crosslinking produced by the cold plasma treatment and more particularly from conventional crosslinking agents. Crosslinking agents which are generally employed are crosslinkable organosilanes, compounds containing allyl groups and acrylic and methacrylic esters.

Examples of crosslinkable organosilanes are trialkoxysilanes such as trimethoxy-, triethoxy- and glycidyloxypropyltrimethoxysilane.

Examples of compounds containing allyl groups are di- and triallyl esters such as diallyl fumarate, phthalate and sebacate, and triallyl cyanurate.

Examples of acrylic and methacrylic esters are methyl and lauryl acrylates and methacrylates, tri-, tetra- and polyethylene glycol dimethacrylates, trimethylolpropane trimethacrylate and tetramethylolmethane tetraacrylate.

(Meth)acrylic esters are efficient and preferred crosslinking agents.

The use of several different crosslinking agents also comes within the scope of the invention.

The agent which accelerates surface crosslinking is generally incorporated into the composition of the treated layer in a proportion of 0.1 to 30% by weight based on the weight of polyvinyl chloride, preferably in a proportion of 0.5 to 10% by weight. In the case of the most efficient crosslinking agents ((meth)acrylic esters) and most especially in the case of tetramethylolmethane tetraacrylate, it has been found that small quantities, of the order of 0.5 to 1.5% by weight, based on the weight of polyvinyl chloride in the treated layer, are preferable, to avoid any interfering surface crosslinking which is produced by an excess of crosslinking agent on the outer face of the layer of the sealing sheet which is not treated using cold plasma.

It has also been found that the effectiveness of the treatment using cold plasma is improved further if the composition of the treated layer is substantially free from ingredients (conventional additives) other than polyvinyl chloride, the plasticizer, the stabilizer(s) and any crosslinking agent which may be present. The "treated layer whose composition is substantially free from other ingredients" means a treated layer containing less than 30% by weight, based on the total weight of the layer, of the other conventional additives listed above.

The composite sheets according to the invention are intended for the impervious coating of construction components covered with a water-repellent hydrocarbon material. To this end, they may be placed on the construction components to be coated either by direct contact, or preferably with the interposition of a felt of any nature, for example a polyester-based felt. This felt may be made an integral part of the composite sheet using any known means. The composite sheet and the felt may be combined, for example, by coating the surface of the treated layer of the sheet with an adhesive, such as a conventional adhesive based on acrylic copolymers, and by then bonding the felt and the sheet. The composite sheets may be merely placed on the construction components to be coated and may be assembled together, if desired, by gluing using adhesives such as epoxide resins, by heat-welding, by high-frequency welding, and the like. This assembly may be effected edge-to-edge, for example with overlapping of the adjoining edges by means of a tape or a strip which may, for example, have the same composition as the layer of the composite sheet which is not subjected to the cold plasma treatment. This assembly may also be effected by overlapping the corresponding edges of two adjacent sheets. In this case, the cold plasma treatment of the sheet layer which is intended to be placed on the hydrocarbon material is preferably applied only to the parts of the surfaces which are not in mutual contact.

The composite sheets according to the invention may be suitable for impervious coating of any construction component covered with a water-repellent hydrocarbon material, such as components of civil engineering works such as, for example, dams, bridges, canals, tunnels and the like, and such as foundations and the like; they are particularly highly suitable for the impervious coating of building roofs covered with bitumen-based materials and materials based on expanded polystyrene.

The composite sheets according to the invention may be strengthened using conventional reinforcements such as glass fibre or polyester fibre reinforcements, and the like.

DESCRIPTION OF THE PREFERRED EMBODIMENTS

The invention is illustrated by the examples given below without any limitation being implied.

Example 1

A film (A) is prepared by calendering a composition comprising (a) 100 parts by weight of a vinyl chloride homopolymer, (b) 68 parts by weight of diisodecyl phthalate, (c) 4 parts by weight of a stabilizing system containing barium, cadmium and lead, (d) 10 parts by weight of calcium carbonate, (e) 3 parts by weight of a flameproofing system based on antimony, (f) 1 part by weight of a fungicidal agent (hydroxybiphenoxyarsine) and (g) 8.5 parts by weight of pigments based on titanium dioxide and carbon black.

Another film (B) is prepared by calendering a composition comprising the ingredients (a), (b) and (c) in the same proportions as in the composition intended for preparing the film (A) above and, in addition, one part by weight of tetramethylolmethane tetraacrylate (h).

The films (A) and (B) are assembled by hot lamination to form a composite sheet containing two superposed layers with thicknesses, respectively, of 1.5 mm (layer (A)) and 0.12 mm (layer (B)).

The outer face of layer (B) of the composite sheet is then subjected to a cold plasma treatment produced in the plasma chamber of a plasma generator device at low temperature by the application of an electrical current with a power of 40 kW at a frequency of 110 kHz, the atmosphere in the plasma chamber being maintained at a pressure of $4 \cdot 10^{-2}$ torr, with admission and continuous discharge of a gaseous mixture consisting of an equimolar mixture of CO and argon.

The continuous cold plasma treatment is carried out at the rate of 30 m/min.

The plasticizer extraction resistance of the composite sheet produced in this manner and treated and then deposited on hot bitumen is measured after an accelerated test for 28 days at 70° C. (according to the DIN standard 16,726).

The residual plasticizer content is 97% of the original plasticizer content.

Example 2

1 film (B') is prepared, with a composition identical to that of film (B) of Example 1 and a thickness of 0.69 mm.

1 film (A') is prepared, with a composition identical to that of film (A) of Example 1 and a thickness of 0.89 mm.

Film B' is heat-laminated to film A', between rolls 3 and 4 at the time of calendering of the film A'. A film with a total thickness of 1.5 mm is obtained.

The outer face of the layer (B') of the composite sheet is then subjected to a treatment with a cold plasma produced in the plasma chamber of a plasma generator device at low temperature by the application of an electrical current with a power of 40 kW at a frequency of 110 kHz, the atmosphere in the plasma chamber being maintained at a pressure of $4 \cdot 10^2$ torr with the admission and continuous discharge of a gaseous mixture consisting of an equimolar mixture of CO and argon.

The continuous treatment using cold plasma is performed at the rate of 15 m/min.

The plasticizer extraction resistance of the composite sheet produced in this manner and treated and then deposited on hot bitumen is measured after an accelerated test of 28 days at 70° C. (according to the DIN standard 16,726).

The residual plasticizer content is 97% of the original plasticizer content.

Example 3

Example 1 is reproduced except that no ingredient (h) is included in the composition intended for preparing the film (B).

The residual plasticizer content is 88% of the original plasticizer content.

Example 4

This example is given by way of comparison.

A calendered sheet consisting solely of the film (A) is subjected to the accelerated plasticizer extraction test referred to in Example 1.

At the end of this test, the residual plasticizer content of the sheet is only 45% of the initial content.

Example 5

This example is given by way of comparison.

The calendered sheet referred to in Example 4, which has previously been subjected to the plasma treatment under the conditions described in Example 1, is subjected to the accelerated plasticizer extraction test referred to in Example 1.

At the end of this test, the residual plasticizer content of the sheet is only 60% of the initial content.

What is claimed is:

1. A composite sheet for the impervious coating of construction components which are covered with a water-repellant hydrocarbon material, the composite sheet consisting essentially of:
   at least two layers which are superposed are flexible,
   wherein a first layer of said at least two layers is additionally comprised of a plasticizer and a crosslinking agent, has a surface intended to be placed in contact with said water-repellant hydrocarbon material in use, has been subjected to a plasma treatment, and is substantially free from ingredients other that polyvinyl chloride, plasticizer and crosslinking agent.

2. The composite sheet according to claim 1, wherein the crosslinking agent is selected from the group consisting of crosslinkable, esters containing allyl groups, acrylic esters and methacrylic esters.

3. The composite sheet according to claim 1, wherein the first layer whose surface was subjected to the cold plasma treatment contains from 0.5 to 1.5% by weight, based on the weight of polyvinyl chloride, of tetramethylomethane tetraacrylate.

* * * * *

UNITED STATES PATENT AND TRADEMARK OFFICE
CERTIFICATE OF CORRECTION

PATENT NO. : 4,885,210

DATED : December 5th, 1989

INVENTOR(S) : Walter Dalle Vedove

It is certified that error appears in the above-identified patent and that said Letters Patent is hereby corrected as shown below: On the title page:

In line [75], please change "D. Vedove" to --Dalle Vedove--.

Item [19] "Vedove" should read --Dalle Vedove --

Signed and Sealed this

Twentieth Day of November, 1990

*Attest:*

HARRY F. MANBECK, JR.

*Attesting Officer*          *Commissioner of Patents and Trademarks*